United States Patent [19]
Ring et al.

[11] Patent Number: 5,613,299
[45] Date of Patent: Mar. 25, 1997

[54] METHOD OF FABRICATING A ROCKET THRUST CHAMBER

[76] Inventors: Peter J. Ring, 20335 Hickory Hill Way, Saratoga, Calif. 95070; Mihkel Kangilaski, 260 S. 15th St., San Jose, Calif. 95112

[21] Appl. No.: 336,636

[22] Filed: Nov. 9, 1994

[51] Int. Cl.$^6$ ........................................... B23P 15/00
[52] U.S. Cl. .......................... 29/890.01; 29/523; 60/257
[58] Field of Search ................. 29/890.01, 507, 29/505, 522.1, 523; 60/257

[56] References Cited

U.S. PATENT DOCUMENTS

| | | | |
|---|---|---|---|
| 3,090,702 | 5/1963 | Commanday et al. | 117/106 |
| 3,230,613 | 1/1966 | Rechin et al. | 29/890.01 |
| 3,315,471 | 4/1967 | Dailey et al. | 60/203 |
| 3,354,652 | 11/1967 | Novotny et al. | 60/260 |
| 3,694,883 | 10/1972 | Olcott | 29/890.01 |
| 3,723,742 | 3/1973 | Aranguren et al. | 250/106 |
| 3,780,533 | 12/1973 | Huang | 60/260 |
| 3,897,316 | 7/1975 | Huang | 29/890.01 |
| 4,707,225 | 11/1987 | Schuler et al. | 29/890.01 |
| 4,917,968 | 4/1990 | Tufflas | 428/621 |
| 4,942,653 | 7/1990 | Hawkinson | 29/890.01 |
| 5,154,352 | 10/1992 | Buckreus | 29/890.01 |
| 5,375,325 | 12/1994 | Bales et al. | 29/890.01 |

*Primary Examiner*—Irene Cuda
*Attorney, Agent, or Firm*—Skjerven, Morrill, MacPherson, Franklin & Friel; Thomas S. MacDonald

[57] ABSTRACT

A fabricating method of one-piece refractory metal rocket engine chamber is described. Hollow liner sections of a platinum group metal or alloy are inserted into a chamber barrel portion to form the combustion chamber, connecting into a conical portion, a venturi throat and into a second conical portion, forming an expansion nozzle exit of the chamber. The hollow liner sections correspond to the interior shapes of the chamber portions. A refractory metal split mandrel and welded end caps complete an assembly which is press formed at high temperature and pressure, undergoing a cyclic hot isostatic pressing to firmly bond the liner sections to the chamber portions. Scarfed edges of the liner sections are also bonded. The end caps and split mandrel are then machined out of the chamber and residual molybdenum removed resulting in a lined rocket engine chamber.

8 Claims, 3 Drawing Sheets

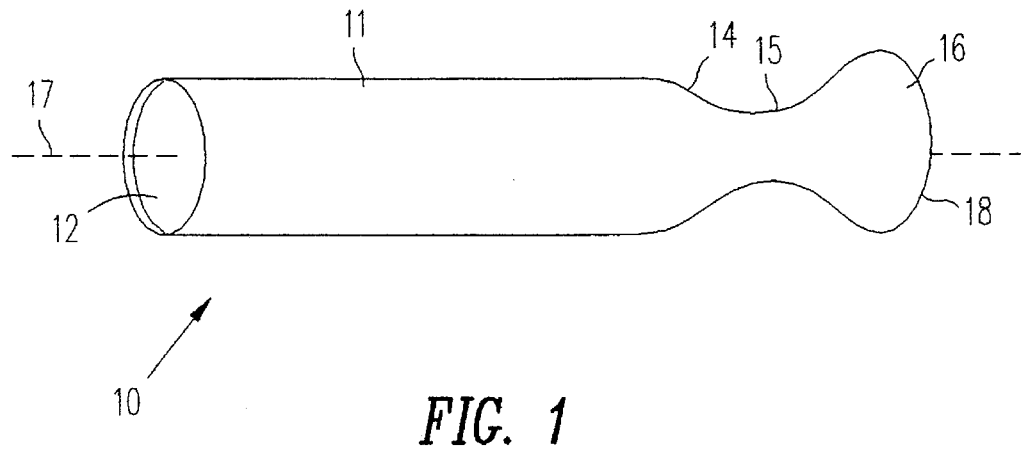
FIG. 1
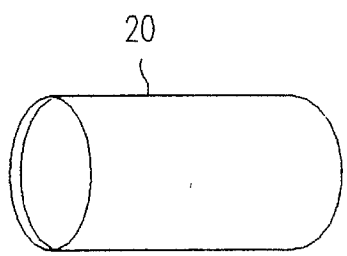     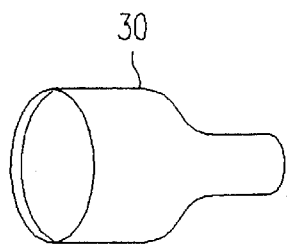     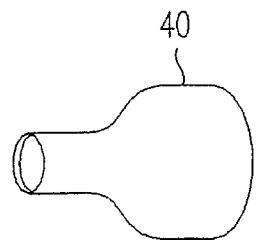
FIG. 2     FIG. 3     FIG. 4

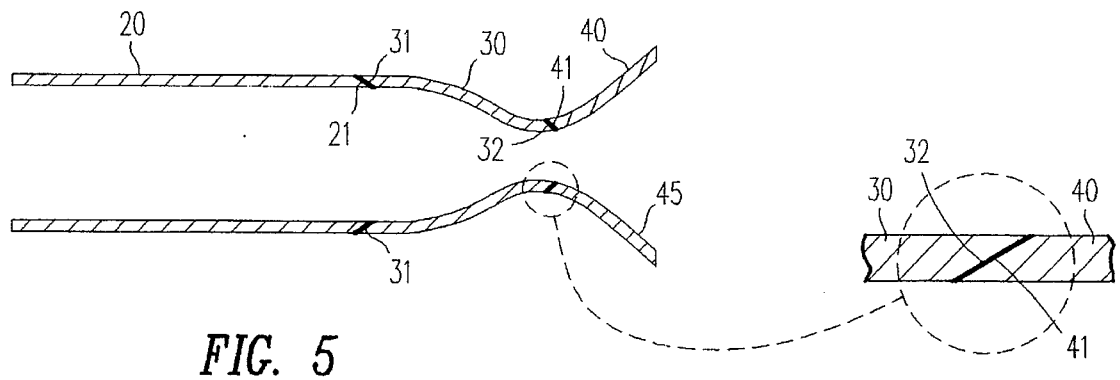
FIG. 5
FIG. 5A
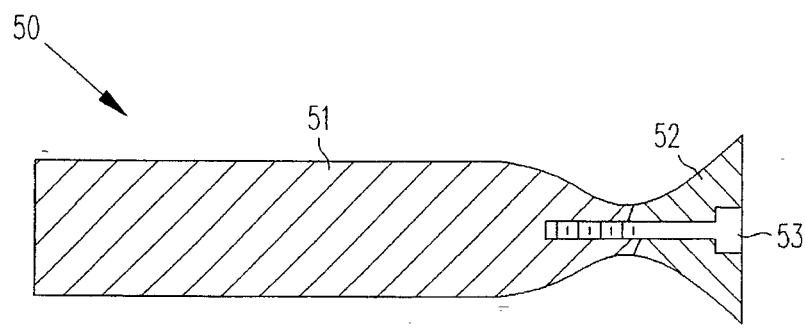
FIG. 6
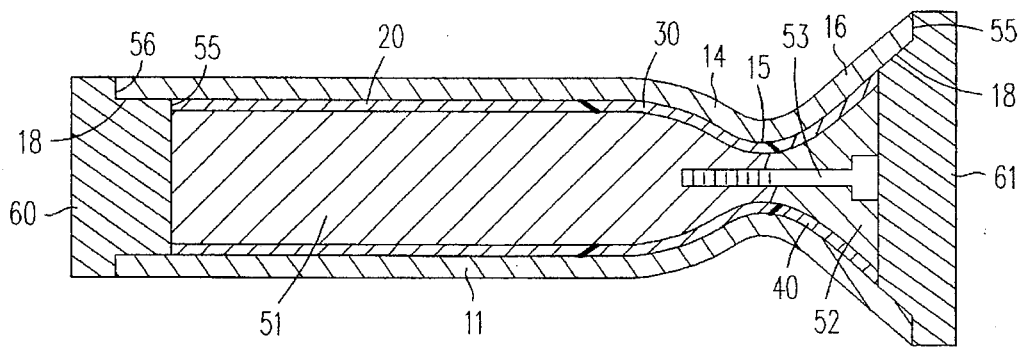
FIG. 7

METHOD OF FABRICATING A ROCKET THRUST CHAMBER

FIELD OF THE INVENTION

This invention relates to a rocket thrust chamber for thrusters or bipropellent rocket engines. More particularly, the invention is directed to high temperature thrust chambers for relatively small rocket engines generally of about 5–100 pounds of thrust which are difficult to cool regeneratively.

BACKGROUND OF THE INVENTION

Rocket engine liquid fueled thrust chambers of the larger thrust type, typically of many hundreds, many thousands or even millions of pounds of thrust, employ regeneratively cooled thrust chambers where pressurized (pumped) propellant is first passed through thrust engine tubing or channels forming the shell or cooling jacket of the chamber, before being injected into the combustion chamber. The cool fuel or oxidizer in a bipropellant system, for example, liquid oxygen at −180° C. or other oxidizer, thus keeps the combustion chamber at a sufficiently low temperature to preserve the structural integrity of the thrust chamber. In the case of smaller thrust thrusters used for intermittent thrust control of a space vehicle or satellite, thrust chambers have employed film cooling. Film cooling employs a protective coating of propellant which is sprayed along the inner surface of the thrust chamber. Evaporation of the film cools the chamber wall. Although film cooling is efficient, it is to be avoided since it lowers the overall specific thrust by using propellant for a purpose other than producing thrust. Regeneratively cooled engines are considered more efficient since coolant is not wasted but, in fact, augments the initial energy at injection by its increased heat content.

Conventional thrusters currently in use have a minimal upper temperature limit of about 2400° F. (1315° C.) and a limited life span of about ten hours. These conventional thrusters, using a hydrazine propellant for example, and a thrust chamber constructed of niobium alloys, necessarily will use about 40% of the fuel for film cooling in order to keep the thrust chamber walls below this temperature. Since the propellant is the major mass item for satellites being put in space, a considerable incentive exists to decrease or obviate the need for film cooling and hence the amount of on-board fuel.

U.S. Pat. No. 3,354,652 discusses the difficulty of regeneratively cooling small liquid propellant, engines resulting inter alia of boiling or decomposition of the coolant within the coolant jacket. While it has been suggested to apply high temperature insulation e.g. metal oxides, to the combustion side of the chamber to reduce the coolant bulk temperature during steady state firing, this can result, upon engine shut down in additional stored heat in the insulation causing localized heating and decomposition of remaining stagnant propellant. The patent somewhat solves the problem by suggesting a tantalum alloy liner coupled with a stagnant gas or vacuum enclosed space and helical two-way flow coolant channels.

U.S. Pat. No. 3,780,533 discloses the use in regeneratively cooled chambers utilizing cooling channels, of a composite wall including a deposit of electroformed nickel, or a sheet of nickel or of refractory alloys, such as copper-silver or molybdenum-rhenium alloys, brazed to lands in a middle wall component. U.S. Pat. No. 3,315,471 shows with respect to thrusters utilizing radioisotope fuel, structural elements of the thrustor, namely spaced shells, preferably constructed of tungsten. U.S. Pat. No. 3,723,742 shows the use of noble metals and refractory metals surrounding a radioisotope fuel casing.

U.S. Pat. No. 4,917,968 describes a thrust chamber structure where a ductile layer of a platinum group metal including iridium is deposited by chemical vapor deposition on a mandrel and a layer of refractory metal deposited thereover also by chemical vapor deposition, with a solid solution of the two metals present between and metallurgically bonded to the two metal layers.

SUMMARY OF THE INVENTION

The present invention is directed to a refractory metal one-piece thrust chamber for use in a bi-propellant rocket engine employing, for example, hydrazine and nitrogen tetroxide propellants. The chamber typically constructed of tantalum, tantalum-(10%) tungsten, rhenium or rhenium-tungsten alloys is formed by spin forming, swaging or machined from bar stock, into which discrete liner sections of platinum group metals (e.g. rhodium, iridium or their alloys) are bonded by diffusion bonding, explosive bonding, hot isostatic pressing (HIP), isostatic forging, rapid omni-directional compaction or by the Ceracon process which utilizes fused silica to apply bonding pressure. A cylindrical first liner section of oxidation resistant material such as rhodium, rhodium alloy e.g. platinum (80%)—rhodium (20%) alloy is sized to be bonded to a cylindrical barrel portion of the refractory metal chamber. An essentially conical second liner section of iridium is constructed to be bonded to a downstream end of the barrel portion and to a converging conical portion of the chamber. By scarfed end the second liner section is bonded to a scarfed end of the first liner section. The second liner section extends from the barrel portion along the inner surface of a first conical portion of the chamber. An essentially conical third liner section of iridium or iridium-rhodium alloy is constructed to be bonded to a second diverging conical portion of the chamber and also by a scarfed end joined to a scarfed end on an overlapping end of the second liner section. The third liner section forms an engine expansion nozzle with the second conical portion of the outside chamber. High bonding pressure is applied usually at elevated temperature to press bond the overlapping liner sections together and to press bond the lining sections to the respective thrust chamber portions.

In a preferred fabrication process a refractory alloy thrust chamber is constructed to be about 0.6 cm oversize in length at each end to accommodate end plugs after the placement of the liner sections and a split mandrel within the hollow confines of the refractory alloy thrust chamber. The mandrel is preferably constructed of molybdenum. The liner sections are assembled on the mandrel to confirm fit and conformance, particularly at the overlapping scarfed joints. The liner and mandrel is then disassembled and the liner reassembled on the mandrel within the refractory alloy thrust chamber. The total liner length is designed and constructed to meet the thrust chamber design longitudinal dimension i.e. without the oversize 0.6 cm. ends, so that a seat is formed to receive end plugs. The end plugs, preferably of the same material as the chamber are electron beam welded into each end of the thrust chamber and liner. The assembly is then preferably hot isostatically pressed using a cyclic high internal pressure and temperature in an argon atmosphere. The plugs and mandrel are then machined out of the chamber and its bonded liner. This will leave a thin (approximately 0.3 cm.)

"skin" of molybdenum on the liner interior peripheral surfaces which skin is then chemically removed.

BRIEF DESCRIPTION OF THE DRAWINGS

FIG. 1 is a schematic perspective view of the refractory metal thrust chamber.

FIG. 2 is a schematic perspective view of a first liner section.

FIG. 3 is a schematic perspective view of a second liner section.

FIG. 4 is a schematic perspective view of a third liner section.

FIG. 5 is a schematic longitudinal cross section of the assembled liner sections showing the scarfed connection joints with FIG. 5A being an enlarged view of one of the joints.

FIG. 6 is a schematic longitudinal cross sectional view of a split mandrel used to position the liner sections into the refractory metal thrust chamber.

FIG. 7 is a schematic cross sectional view of the assembled refractory metal thrust chamber, the three liner sections and the split mandrel

DETAILED DESCRIPTION

Figure 8:
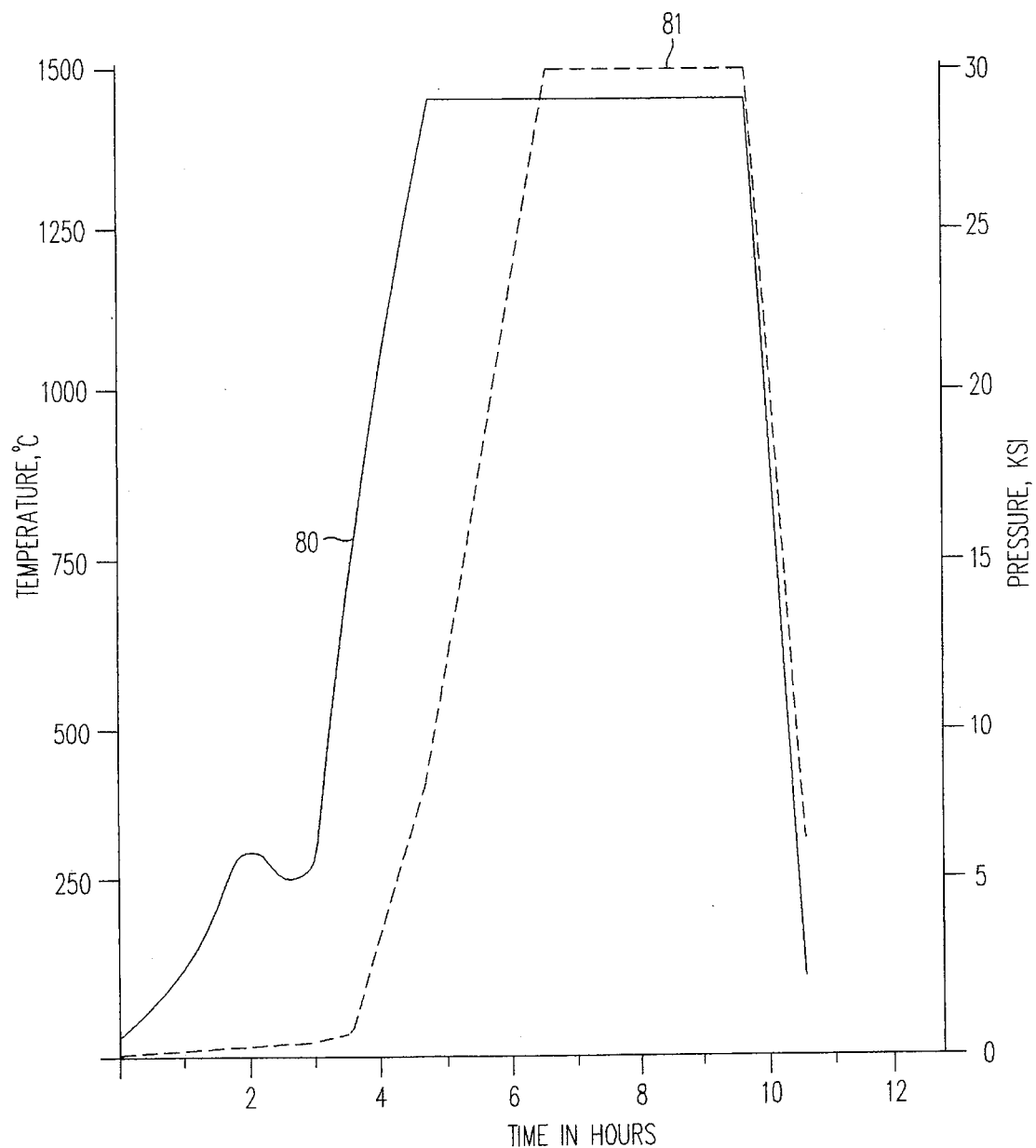
FIG. 8 is a time-temperature-pressure cycle graph of the preferred hot isostatic bonding process.

Referring to FIG. 1, a refractory metal or refractory alloy thrust chamber 10 is fabricated by any one of standard fabrication processes such as spin forming from a plate or tube, swaging from tube stock or machined from bar stock. In fabricating these chambers to the venturi shape, it may be necessary to use split mandrels or mandrels that are later removed by chemical dissolution. The integral chamber is of one-piece construction and includes a cylindrical barrel portion 11, the interior 12 of which forms a combustion chamber, a first essentially conical portion 14 upstream of a venturi throat 15, and a second essentially conical portion 16 downstream from throat 15 forming an expansion nozzle exit 18. These portions are arranged along a longitudinal central axis 17.

The refractory metal or refractory alloy may be rhenium, rhenium-tungsten alloy, tantalum-tungsten alloy, columbium-hafnium alloy, tungsten-rhenium-hafnium carbide alloy, molybdenum-rhenium alloy or other refractory alloys with relatively high melting points, i.e. over 2000° C. and high tensile stress i.e. over 10,000 psi at 2000° C.

FIG. 2 illustrates a cylindrical first liner section 20 which is sized to be generally coextensive with the interior periphery of portion 11 save for the oversized (0.6 cm.) ends 18 (FIG. 7) of the chamber 10. Section 20 is fabricated from a highly oxidation resistant material e.g. rhodium or platinum or their alloys to provide maximum oxidation protection for the region of the thrust chamber to be exposed to the more highly oxidizing fuel/oxidizer mixture. Oxidation resistance is measured by weight loss or recession in mg/cm$^2$/hr. The preferred materials will have a weight loss less than 1 mg/cm$^2$/hr. The liner for this region is formed from sheet into a cylinder by any suitable method e.g. by roll forming, drawing or directly by spin forming.

FIG. 3 illustrates an essentially conical second liner section 30 sized to be generally coextensive with the interior periphery of portion 14. This conical section leading from the barrel to the venturi throat is fabricated preferably from iridium or iridium-rhodium alloy, by a suitable method such as spin forming, which is the preferred method although other methods e.g. roll forming, are acceptable.

FIG. 4 illustrates an essentially conical third liner section 40 sized to be coextensive with the interior periphery of portion 16 save for end 18. Liner section 40 is constructed in the same manner as liner section 30 and is constructed also from a platinum group metal, preferably iridium or iridium alloy such as iridium-40% rhodium. Each of the liner sections 20, 30 and 40 in a typical construction have a sheet thickness of about 0.05 cm.

All three liner sections as seen in FIG. 5 are provided with an additional length to form an overlapping or scarfed joint not less than about 0.15 cm. in overlap. The scarf or chamfer/bevel angles on the abutting liner sections are opposite from each other to provide effecting mating. As to the downstream sections i.e. 20 vs. 30 and 30 vs. 40, the latter sections 30 and 40 respectively are closest to the thrust chamber exit 45. Scarf 31 thus overlaps scarf 21 and scarf 41 overlaps scarf 32 as clearly seen in FIG. 5A.

As seen in FIG. 6 a split mandrel 50 has a first part 51 sized to correspond to the interior periphery of sections 20 and 30 and a second part 52 sized to correspond with the interior periphery of section 40. The split mandrel is fabricated from molybdenum, molybdenum alloy or suitable alternate such as tungsten. The liner is first assembled onto the mandrel to confirm fit and conformance, particularly the overlapping joints. The liner/mandrel is then disassembled. The liner sections are reassembled on the mandrel within the refractory alloy thrust chamber. Each of the sections of the liner and parts of the mandrel are slidingly assembled in the thrust chamber portions and liner sections, respectively in a close fit clearance of approximately 0.15 mm. The two parts of the split mandrels are held together and assist in holding the liner sections in the thrust chamber 10 by a screw bolt 53. The screw bolt is also made from molybdenum.

The 0.6 cm of additional thrust chamber length at each end 18 is thus free of liner and forms at each end shoulders 55 and 56 to receive end plugs 60 and 61, respectively. The end plugs preferably made of the same material as the chamber are electron beam welded into the open ends of the first and third liner sections and the chamber ends.

The assembly of FIG. 7 is then diffusion bonded e.g. hot isostatically pressed (HIP'd) together following the pressure/time/temperature cycle shown in FIG. 8 where the solid line 80 is the temperature/time line and the dash line 81 is the pressure/time line. The HIP'ing process produces a strong metallurgical bond between the thrust chamber and the liner material. A total process time of about 13 hours generally is needed when pumping time and full cooling time are considered.

The following steps detail the hot isostatic pressing (HIP) cycle to be followed in press forming the preferred thrust chamber portions, the liner sections and mandrel/end plugs together.

(1) Evacuate the HIP chamber.

(2) Flush with argon and bake in argon at 260° C. (500° F.)±20° C.(68° F.) for 30 minutes±5 mins at 200 psi±20 psi. NOTE: When dumping argon, pressure in HIP chamber should not be reduced below one atmosphere.

(3) Repeat step (2)

(4) Raise temperature to 800° C. (1427° F.) at a rate of approximately 20° C./min. letting pressure increase naturally with temperature.

(5) Raise temperature from 800° C. (1472° F.) to 1450° C. (2642° F.) at a rate of approximately 10° C./min.

Increasing pressure at 100 psi/min until the temperature reaches 1450° C.

(6) Maintain temperature at 1450° C. (2642° F.)±50° C. (122° F.) and increase pressure to 30,000 psi at a rate of approximately 200 psi/min.

(7) Maintain temperature at 1450° C. (2642° F.)±50° C. (122° F.) and the pressure at 30,000 psi±250 psi for 3 hours ±20 min.

(8) Reduce temperature at approximately 20° C./min; allowing the pressure to decrease at its natural rate resulting from the cooling, i.e., do not add or vent argon during this step.

(9) After the temperature has decreased to 100° C. (212° F.), the residual argon pressure may be reduced at any convenient rate.

The above mentioned HIP cycle pertains to bonding Re and/or Ta-10W with Ir and/or Pt—Rh alloys. Different HIP cycle are necessary if Re needs to be bonded to Ta-10W. See FIG. D-1 of Reference NASA-CR-134409.

The HIP chamber is comprised of a thick walled pressure vessel, which encloses a furnace which heats the argon gas. The HIP may be in the range of from about 1000° C. to about 1900° C. and the HIP pressure may be in the range of from about 20000 psi to about 45000 psi.

FIG. 8 illustrates the cycle graphically.

Experiments have been performed by the above mentioned HIP cycle. These experiments show that tantalum (90%)—tungsten (10%) is successfully bonded to iridium, rhodium and to platinum (80%)—rhodium (20%). Rhenium is also bonded to iridium, rhodium, and to platinum (80%)—rhodium (20%).

After the completion of the HIP cycle, the assembly is disassembled (FIG. 7) by removing end plugs 60 and 61 by machining. As much as possible, of the molybdenum mandrels 51 and 52 and the molybdenum screw 53, is also removed by machining. The remaining thin (0.3 cm) molybdenum "skin" is removed by dissolving in aqua regia ($H_2O$, $HNO_3$, $HCl$).

In certain applications, a specific diffusion barrier of rhenium or tungsten foil (~0.2 mm thickness) may be inserted between the iridium and/or rhodium liner and the refractory alloy (Ta—10W alloy) thrust chamber.

The above description of embodiments of this invention is intended to be illustrative and not limiting. Other embodiments of this invention will obvious to those skilled in the art in view of the above disclosure.

We claim:

1. The method of fabricating a thrust chamber comprising:

forming a one-piece hollow refractory metal thrust chamber having barrel portion forming a combustion chamber, a first conical portion extending to a venturi throat and a second conical portion extending from the venturi throat and forming an expansion nozzle;

positioning a hollow metal first liner section in said barrel portion;

positioning a hollow metal second liner section in said first conical portion;

positioning a hollow metal third liner section in said second conical portion;

overlapping scarfed ends of abutting liner sections;

inserting a split mandrel in the hollow of said liner sections;

forcing elements of said split mandrel together to push said liner sections against said chamber portions;

sealing the ends of said hollow with an end plug; and pressing the mandrel, the end plugs and the liner sections against the chamber portions at sufficient pressure and heat to bond said liner sections to said chamber portions.

2. The method of claim 1 wherein said refractory metal thrust chamber is made from a metal selected from the group consisting of tantalum, rhenium, alloys of tantalum, rhenium-tungsten alloys and tungsten-rhenium-hafnium carbide alloys.

3. The method of claim 1 wherein said refractory metal is rhenium.

4. The method of claim 1 wherein the metal of said first liner section is selected from the group consisting of rhodium, platinum and alloys of rhodium and platinum.

5. The method of claim 1 wherein the metals of said second and third liner sections are iridium, and iridium-rhodium.

6. The method of claim 1 in which said first liner section, said second liner section and said third liner section are formed by spin forming.

7. The method of claim 1 in which each of said liner sections are formed by roll forming the liner section from a flat sheet of metal.

8. The method of claim 1 wherein said pressing step comprises hot isostatic pressing at a temperature of from about 1000° C. to 1900° C., at a pressure of from about 20000 psi to 45000 psi.

\* \* \* \* \*